(12) United States Patent
Weber et al.

(10) Patent No.: US 8,587,806 B2
(45) Date of Patent: Nov. 19, 2013

(54) METHOD AND ARRANGEMENT FOR TRANSFERRING DATA BETWEEN AT LEAST TWO PROCESSING UNITS OF A PRINTER OR COPIER SYSTEM

(75) Inventors: Johannes Weber, Poing (DE); Hubert Spindler, Dürrnhaar (DE)

(73) Assignee: Ocè Printing Systems, GmbH, Poing (DE)

( * ) Notice: Subject to any disclaimer, the term of this patent is extended or adjusted under 35 U.S.C. 154(b) by 1062 days.

(21) Appl. No.: 12/597,210

(22) PCT Filed: Apr. 24, 2008

(86) PCT No.: PCT/EP2008/055000
§ 371 (c)(1),
(2), (4) Date: Oct. 23, 2009

(87) PCT Pub. No.: WO2008/129078
PCT Pub. Date: Oct. 30, 2008

(65) Prior Publication Data
US 2010/0134827 A1    Jun. 3, 2010

(30) Foreign Application Priority Data
Apr. 24, 2007  (DE) .......................... 10 2007 019 312

(51) Int. Cl.
*G06F 15/00* (2006.01)
(52) U.S. Cl.
USPC .......................... 358/1.15; 358/1.12; 358/1.18
(58) Field of Classification Search
USPC .......................................... 358/1.1, 1.9, 1.15
See application file for complete search history.

(56) References Cited

U.S. PATENT DOCUMENTS

| 6,786,149 | B1 | 9/2004 | Lomoine et al. |
|---|---|---|---|
| 7,013,328 | B2 | 3/2006 | Monse et al. |
| 7,040,820 | B2 | 5/2006 | Perdu et al. |
| 7,161,903 | B2 | 1/2007 | Sasamori et al. |
| 7,174,474 | B1 | 2/2007 | Low |

(Continued)

FOREIGN PATENT DOCUMENTS

| EP | 1 185 044 | 3/2002 |
|---|---|---|
| JP | 11338928 A | 12/1999 |
| JP | 2003280835 | 10/2003 |
| JP | 2005144856 | 6/2005 |

OTHER PUBLICATIONS

UP$^3$I Standard; Version 1.20; Feb. 11, 2004—pp. 12-18.
JDF Specification Version 1.3;Sep. 30, 2005—pp. 15-34.

*Primary Examiner* — King Poon
*Assistant Examiner* — Iriana Cruz
(74) *Attorney, Agent, or Firm* — Schiff Hardin LLP

(57) ABSTRACT

In a method to transfer data between at least two processing units of a printing or copying system, processing information to be transferred between the at least two processing units is split up into first data and second data, the first data comprising at least form-related paper travel information for which a real-time processing is required, and the second data comprising processing information for which a real-time processing is not required. The at least two processing units are connected via a real-time-capable data transmission path for transferring the first data. The at least two processing units are also connected via a switched network connection that provides at least one physical layer to transfer data. The switched network connection is utilized to transfer the second data.

12 Claims, 5 Drawing Sheets

(56) References Cited

U.S. PATENT DOCUMENTS

| | | | |
|---|---|---|---|
| 7,542,154 B2* | 6/2009 | Kato | 358/1.12 |
| 7,631,063 B1* | 12/2009 | Ho et al. | 709/223 |
| 2002/0062410 A1* | 5/2002 | Sasamori et al. | 710/36 |
| 2003/0100961 A1 | 5/2003 | Monse et al. | |
| 2004/0190916 A1 | 9/2004 | Seeler et al. | |
| 2005/0055476 A1* | 3/2005 | Aschenbrenner et al. | 710/15 |

* cited by examiner

METHOD AND ARRANGEMENT FOR TRANSFERRING DATA BETWEEN AT LEAST TWO PROCESSING UNITS OF A PRINTER OR COPIER SYSTEM

BACKGROUND

The preferred embodiment concerns a method and an arrangement or system to transfer data between at least two processing units of a printing or copying system in which data with at least processing information are transferred between the processing units. The preferred embodiment also concerns a printing or copying system to process web-shaped substrate material with the aid of at least two proximity units of the printing or copying system and the use of a network connection to provide a data transfer connection between the control stations of at least two processing units of a printing or copying system.

Known high-capacity printing or high-capacity copying systems with print capacities of greater than 100 sheets DIN A4 per minute and printing speeds of up to more than 2 m per second typically comprise pre- and/or post-processing units that are often executed as separate structural units and are coupled with at least one image generation unit. The at least one image generation unit and the pre- and/or post-processing units are arranged in series in a paper travel direction indicating the production direction in order to serially process the substrate material. The paper travel direction is generally the transport direction of the substrate material through the respective high-capacity printing or high-capacity copying system. A high-capacity printer or high-capacity copier is advantageously used as an image generation unit of the high-capacity printing or high-capacity copying system.

The control and coordinate of the processing steps of the individual processing units requires an exchange of data with processing information between the processing units of the printing or copying system. In particular in the processing of web-shaped substrate material, a real-time processing of the processing information pertaining to the paper travel is necessary in order to control the processing steps of the individual processing units and conform them to one another. The desire and the requirement thereby exists to be able to combine apparatuses of different manufacturers into a printing or copying system in that the individual apparatuses are arranged in series so that they advantageously form a complete print path. Depending on the type of and the requirements for the production of a print product to be produced, the print path can also comprise multiple printing units as well as auxiliary apparatuses, for example stackers, cooling tracks, re-moisteners, cutting, folding, binding, stitching, enveloping, franking and/or packaging units.

In order to be able to meet continuously increasing requirements for the processing workflow in the production of print products, in the prior art job ticket chaperone data are known, in particular what are known as job ticket data that are exchanged between multiple software and/or hardware systems in addition to a print data stream or a document data stream. Applications are also known in which job ticket data are inserted into the print data stream. The job ticket data are advantageously stored in a separate file and advantageously correspond to a job definition format known as JDF. In addition to the job definition format, it is also known to provide a job messaging format that is designated as JMF (Job Messaging Format). An industry consortium has agreed upon the JDF specification for the exchange of data formats in the printing process that, at the point in time of the present patent application, exists in version 1.3 from 30 Sep. 2005 and can be downloaded from the Internet page http://www.cip4.org. An overview of this standard is indicated on Pages 15 through 34.

It is also known to provide a specialized, standardized data interface for data exchange between the processing units of high-capacity printing systems and/or high-capacity copying systems. Such a data interface, known as $UP^3I$ (Universal Printer-, Pre- and Post-Processing Interface), has been standardized by an industry consortium. An exchange of data with processing information (in particular of control information) between printing apparatuses and with pre- and post-processing units that can be combined with these printing apparatuses, as well as with a control unit integrated into a processing unit and/or with a separately arranged operating unit, is possible in a simple manner with the aid of the $UP^3I$ data interface. For the $UP^3I$ data interface, typical processing information for the processing units and the processing workflow of a printing path are standardized, in particular as control commands and event messages in the interface commands of the $UP^3I$ data interface. Details regarding this $UP^3I$ data interface as well as the standard of the $UP^3I$ data interface existing in the current version 1.20 as of 2 Nov. 2004 are published on the Internet page http://www.UP3I.org at the point in time of this application. An overview of this standard is indicated on Pages 12 through 18.

It is desirable that a complete page tracking in the processing of individual sheets as well as a complete form tracking in the processing of web-shaped substrate material is ensured with the aid of the data exchange between the individual processing units of a printing system, and that the required error correction measures are determined and executed given an occurred error. These error corrections methods in particular exist to determine whether the printing and the processing of individual pages or forms must be repeated, and if yes, the pages or forms that must be regenerated are to be determined automatically. This is in particular desirable given the projection of comparably complex and large print jobs, for instance in the production of books, so that the entire partially-produced print job is not classified as flawed and the print pages that have already been generated do not have to be separated out as spoilage.

In the prior art there is also known automatic feedback to a data preparation system for the preparation and coordination of print jobs, i.e. in particular to a print server. However, a repeated printing and a repeated processing of the defective pages could be specifically initiated via this feedback.

The printing unit or the printing units generally form the boundary between the pre-processing units and the post-processing units. Depending on the type and design of the printing unit and the processing requirements specified by the print job, arrangements are also selected in which multiple printing apparatuses are arranged in series. Depending on the type and design of the printing apparatus that forms the image generation unit, this is in the position to print print images with one or more colors on the front side and/or back side of the substrate material to be printed. What are known as twin or triple configurations of multiple printing apparatuses can thereby also be provided that consist of two or three printing apparatuses between which intermediate processing units can also be provided, in particular turning units, buffer units (paper buffers), cooling and/or moistening units. Pre-processing units are, for example, unrolling units, single sheet feed units (what are known as feeders), mark printing devices to generate printer's imprints etc. Post-processing units are, for example, stitching machines, cutting machines, folding machines, binding machines, devices to inject additional pages etc.

In addition to the UP³I data interface for the data exchange between the individual processing units of a printing system, proprietary solution approaches to the exchange of control information are known. However, a plurality of these interfaces are not standardized, whereby the exchange of processing information (in particular of control signals) must be adapted for processing units to be combined with one another. For example, at the beginning of the '90s what is known as a Typ1 interface was defined by Siemens AG that has been used in a plurality of high-capacity printers as an interface for the coupling of these printers with pre- and/or post-processing units. For example, the Typ1 interface has eleven usable signals that are unidirectional and that connect multiple processing units with the printing system in a potential-separated manner via optocouplers. A similar interface has been defined by the Xerox Corporation as DFA Level 1.

Starting from such proprietary solutions, the aforementioned standard for UP³I has been developed in order to enable a continuous communication within a digital printing path with apparatuses (i.e. processing units) of different manufacturers. A high degree of automation of the printing path can be achieved via the use of apparatuses with respective UP³I interfaces and via a corresponding data exchange of data with processing information. In particular, UP³I enables automated job changes as well as a central control and a central monitoring of all apparatuses of the printing path, whereby what is known as a single point of operation is possible.

In principle, it is provided to use UP³I both in single sheet printing systems and in printing systems for the printing of web-shaped substrate material. However, the UP³I interface is presently used only for single sheet printing systems since—in spite of the desired for a real-time capability of the UP³I data interface that was formulated in the UP³I standard—a real-time-capable processing of data with processing information is not possible with the aid of the UP³I interface. In single sheet printing systems, a time-critical paper travel control is presently avoided in that the processing information have already been transferred to the respective processing unit before the arrival of a single sheet, whereby the processing information associated with this single sheet are used for its processing when this processing unit detects the arrival of the respective single sheet with the aid of a sheet edge sensor.

At present, a print path for continuous printing (i.e. for the processing of web-shaped substrate material) in which UP³I is used for paper travel control at printing speeds of 1 m per second and faster that functions in practice for high-capacity printer systems is still not actually known since the processing of the web-shaped substrate material with the aid of different processing units requires a real-time processing of at least a portion of the paper travel information that UP³I presently does not provide with the certainty that is required for use in practice.

In known high-capacity printing or high-capacity copying systems, barcodes are printed on the web-shaped substrate material (advantageously on every form to be processed) for form tracking and for paper travel control, which barcodes are then read by barcode readers of the individual processing units in order to verify the position of the substrate material and identify individual print form regions. Corresponding processing information can thereby be applied to the correct region of the web-shaped substrate material.

The data transfer of the UP³I data interface defined in the standard is also physically based on a Firewire data connection between the individual data processing units according to the IEEE 1394 standard. The physical transfer layer, the connection layer for the conversion of transaction queries into packets and to secure transactions given transmission errors, and the transaction layer for an asynchronously secured transfer of data between the processing units, as well as a bus management layer for bus configuration and management activities according to the IEEE 1394 standard are thereby used. Building on this data transmission, a transport layer and at least one application layer are defined by the UP³I interface.

However, in practice problems occur given data connections according to the IEEE 1394 standard in field of industrial printing engineering. In particular, the data transfer according to the IEEE 1394 standard with commercially available components is prone to interference from electromagnetic influences, whereby in practice problems have repeatedly occurred in the transmission of data with processing information in printing systems. Furthermore, the present hardware to provide data transfer connections according to the IEEE 1394 standard and to provide the IEEE 1394 layers required for the UP³I interface only a relatively small selection of software and hardware exists, wherein the prevalence of data interfaces according to the IEEE 1394 standard in new apparatuses continuously decreases, and the selection of interface modules for data interfaces according to the IEEE 1394 standard has also continuously decreased, and many well known manufacturers no longer continue to support this standard. Add to this that there is only one module (known as a link layer module) that can be connected with a microcontroller and that provides a data interface according to the IEEE 1394 standard, wherein it is not foreseeable for what period of time this link layer module will still be available. Additional available IEEE 1394 interface modules have a PCI or PCIe interface and are thus useable only with data processing units that possess a PCI bus. It is thus to be expected that IEEE 1394 data interfaces will in the future be supported only by larger data processing systems such as personal computers and blade servers, whereby the integration into simple pre- and post-processing apparatuses is not reasonable for economic reasons, and a UP³I data interface can thereby no longer be provided for a plurality of processing units.

Additional printing systems with multiple coupled processing units are also known from the documents U.S. Pat. Nos. 7,040,820 B2 and 6,786,149 B1.

SUMMARY

It is an object to specify a method and an arrangement to transfer data between at least two processing units of a printing or copying system via which the transfer of this data is possible in a simple and secure manner. A printing system and a suitable possibility to transfer data between multiple processing units of a printing or copying system are also to be specified.

In a method to transfer data between at least two processing units of a printing or copying system, processing information to be transferred between the at least two processing units is split up into first data and second data, the first data comprising at least form-related paper travel information for which a real-time processing is required, and the second data comprising processing information for which a real-time processing is not required. The at least two processing units are connected via a real-time-capable data transmission path for transferring the first data. The at least two processing units are also connected via a switched network connection that provides at least one physical layer to transfer data. The switched network connection is utilized to transfer the second data.

DESCRIPTION OF THE PREFERRED EMBODIMENTS

Figure 1:
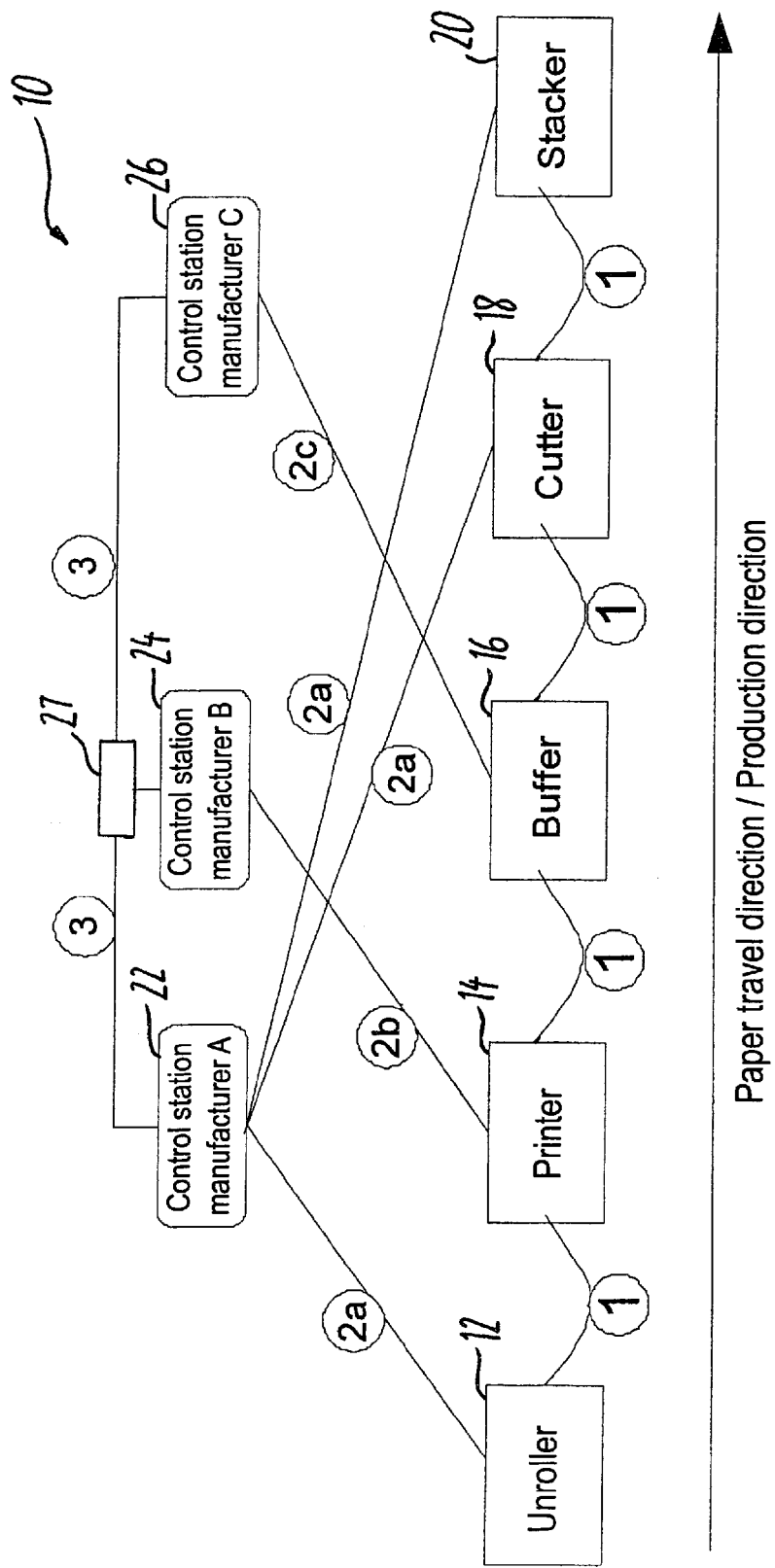
FIG. 1 is a schematic representation of a first control system to control processing units of a print path according to a first embodiment of the invention.

For the purposes of promoting an understanding of the principles of the invention, reference will now be made to the preferred embodiments/best mode illustrated in the drawings and specific language will be used to describe the same. It will nevertheless be understood that no limitation of the scope of the invention is thereby intended, and such alterations and further modifications in the illustrated device and method, and such further applications of the principles of the invention as illustrated as would normally occur to one skilled in the art to which the invention relates are included.

Via a method to transfer data between at least two processing units of a printing system as disclosed herein in preferred embodiments, it is achieved that the data can be transferred in a simple manner via a switched network connection. Such a data connection can in particular occur via a switched Ethernet network connection according to the IEEE 802.3 standard or a related data transfer standard to provide a switched network connection, for example the IEEE 802.11 standard. The network components for such switched networks are already being integrated into a plurality of hardware modules, such as motherboards of personal computers and blade servers, and into modern microcontrollers, and are also cost-effectively available as separate hardware modules in the most varied embodiments. These hardware modules also exhibit no or only slight errors due to their high prevalence up to now.

It is particularly advantageous to transfer only data that require no real-time processing via the switched network, and to provide an additional, separate, real-time-capable data connection between the processing units in order to transfer at least the data or the processing information that require a real-time processing. The possibility is then thereby created to also transfer paper travel information from web-shaped substrate material between the processing units of the printing or copying system and to process it in real time. The real-time-capable data connection advantageously has a transfer protocol that supports (and thus enables) the real-time-capable data transfer.

The mode of operation of control units and/or data processing systems in which the data processing runs nearly simultaneously with the corresponding processes in reality (i.e. the processing processes executed by the processing units) is thereby viewed as real-time processing. The transmission lengths for the transmission of the data between the processing units must thereby be designed so that they allow a data transfer that enables such a real-time operation. The processing of the data can thereby occur without noticeable delay relative to a triggered event, such as a feed of the substrate material by a specific transport distance. The data transmission length must thereby guarantee that the transfer of the corresponding data occurs within a predetermined time span or is concluded at a predetermined point in time after occurrence of a triggered event. It can thereby be ensured that a processing unit that receives and additionally processes the data activates or implements the required activities promptly or exactly at the required point in time.

Large amounts of data can be transferred via the switched network connection. The transmission of relatively large data sets between the processing units of the printing system can in particular be required given the configuration of the printing or copying system to transfer configuration information between the individual processing units of the printing system. The configuration of the printing system advantageously runs independently and automatically, wherein the data with the processing information and especially with the configuration information are transferred between the processing units and/or between at least one processing unit and a separate control panel with the aid of the switched network connection. Such a separate control panel is also a processing unit in the sense of the preferred embodiment with regard to the data transfer. The transferred processing information can in particular also comprise program data and configuration data.

For a better understanding of the present invention, in the following reference is made to the preferred exemplary embodiments shown in the drawings that are described using specific terminology. However, it is noted that the protective scope of the invention should not thereby be limited since such variations and additional modifications of the shown devices and/or of the described methods as well as such additional applications of the invention as they are indicated therein are viewed as typical present or future specialized knowledge of a competent man skilled in the art. The figures discussed hereafter show exemplary embodiments of the invention.

A control system 10 to control processing units of a print path that comprises the control units 12 through 20 of the processing units of the print path is shown in FIG. 1, wherein the control unit 12 controls an unrolling unit, the control unit 14 controls a printing unit, the control unit 16 controls a buffer unit, the control unit 18 controls a cutting unit and the control unit 20 controls a stacking unit.

In the present exemplary embodiment, the control units 12, 18 and 20 are respectively associated with the processing units produced by the manufacturer A, the control unit 14 is associated with a printing unit produced by the manufacturer B and the control unit 16 is associated with a buffer produced by the manufacturer C, or a respective component of these processing units. The control system 10 also has three control stations 22, 24, 26, wherein the control station 22 is provided by the manufacturer A, the control station 24 is provided by the manufacturer B and the control station 26 is provided by the manufacturer C, respectively as superordinate communication control for data exchange between the processing units of the different manufacturers A, B, C. A proprietary data connection 2a for communication between the control station 22 and the control units 12, 18, 20 is respectively provided between the control station 22 of the manufacturer A and the control units 12, 18 and 20. A proprietary data connection 2b for data exchange between the control station 24 and the control unit 14 is provided between the control station 24 of the manufacturer C and the control unit 14 of the printing unit. A data connection identified with the reference character 2c for communication between the control station 26 and the control unit 16 is provided between the control station 26 of the manufacturer C and the control unit 16 of the buffer.

The control stations 22 through 26 are connected with one another via a switched network (in particular a switched Ethernet), wherein every control station is connected with a network switch 27 via a respective network connection 3. Such a network switch 27 is also designated as a switching hub and advantageously serves to precisely relay data packets from one of the control stations 22 through 26 to a destination control station 22 through 26 or also to multiple destination control stations 22 through 26. If the network between the control stations 22 through 26 is designed as an Ethernet network according to one of the standards IEEE 802.3 or IEEE 802.1, this network is also designated as switched Ethernet due to the network switch 27 that is used. The network switch 27 advantageously stores data specific to a destination control station 22 through 26 in a cache and transfers it to the destination control station 22 through 26 in an additional independent action. A possibility to transfer large data sets for the transmission of processing information between the destination control stations 22, 24, 26 of the different manufacturers A, B, C is achieved via the network connections 3 between the control stations 22 through 26.

Due to the very cost-effective and highly developed network components for switched networks that additionally have a low EMC sensitivity and a high system stability as well as a simple configuration, a very simple and reliable possibility is achieved to transfer processing information that require no real-time processing via these switched network connections 3 between the control stations 22 through 26, and thus between the processing units.

A data transfer connection 1 between the control units 12 through 20 is also respectively provided, wherein this data connection 1 can be executed as a daisy chain or as a bus system. Real-time-capable bus systems (in particular known field bus systems) can be used as a bus system. In the present exemplary embodiment, the CAN bus system propagated in the automobile industry is preferably used. Data with processing information that require a real-time processing are then transferred along the transport path of the substrate material to be processed (paper travel direction) between the processing units via this data connection 1. This processing information in particular comprises paper travel information, for example the feed of the substrate material, stop signals, start signals etc. that have occurred and/or are required in individual processing units 12 through 20. Form-related paper travel information is advantageously generated, wherein a form in this context designates a printing region (for example a print page) on a web-shaped substrate material.

The data connection 1 can alternatively also be provided with the aid of hard-wired control signals, for example via the Typ1 interface, which enables a real-time processing of the processing information provided by the control signals. Information that serve for data transfer of the processing information is thereby coded via the control signals.

To realize the data connection 1 between the control units 12 through 20, an Ethernet data connection (for example "raw" Ethernet") can also respectively be used. For example, a data connection can be established between Ethernet network adapters with the aid of a crossover Ethernet cable for such a direct data connection. Such Ethernet network adapters are respectively integrated into the control units 12 through 20 to be connected or are connected with the respective control unit. The data to be transferred can thus accordingly be transferred securely within agreed upon time periods with processing information that are in particular required by a real-time processing. To ensure these time periods, what are known as slots are provided in which specific data sets (data packets) can be transferred. These slots are repeatedly provided at preset, regular time intervals so that a data transfer of specific data (for example the paper travel information) can occur at these points in time. In the exemplary embodiment according to FIG. 1, a separation of the data with processing information that require a real-time processing and the data with processing information that do not require a real-time processing thus occurs, wherein the data that require a real-time processing have only a very small data volume.

The data connection 3 of the switched network can, for example, be operated via a standard Ethernet according to the TCP/IP or UDP protocol. The use of Ethernet or other prevalent switched networks in particular exists in that standard hardware and software can be used that is present on nearly any platforms, and can thereby be used cost-effectively.

A real-time transfer of the data between the processing units would alternatively also be possible with the aid of what are known as real-time Ethernet network connections. In contrast to standard Ethernet, however, real-time Ethernet requires special hardware and/or software. These are not available for all control units and platforms, wherein both the hardware and the software have not matured to the same degree as standard Ethernet. Real-time Ethernet is also more susceptible to driver errors due to the markedly higher complexity, and standard software cannot be resorted to for a plurality of applications, such that a significant effort is required for integration of real-time Ethernet in an application.

For example, only four of eight connection lines are required for network data transmission in standardized Fast Ethernet, in which connection cables (what are known as patch cables) are provided with RJ45 plug connectors, such that four connection lines (individual wires) of the cables are unused. For example, these connection lines can be used in order to provide a real-time-capable data connection (for example via the CAN bus). This has the advantage that at least two separate cables do not need to be connected with each processing unit or with each control station 22, 24, 26 to provide the switched network and the real-time-capable data connection. At least when every processing unit has its own control station 22 through 26, only a single connection cable for data transfer between each processing unit and the network switch 27 is then sufficient, wherein the other connection lines that are used for the real-time transmission are not even connected by the switch 27. However, the expense for separate cables to provide the switched network connection (data connection 3) and the real-time-capable data connection (data connection 1) is also relatively low.

In particular, the configuration and management information established in the $UP^3I$ standard and other processing information that do not require real-time processing can be transferred via the network connection 3. These data can also comprise program data and/or configuration data to provide user interfaces for operation of the individual processing units, whereby what is known as a single point of operation can be provided according to the $UP^3I$ standard for all processing units 12 through 20 of the print path. Such a single point of operation is an operating unit via which all processing units can be monitored and controlled.

The paper travel information established in the $UP^3I$ standard, or at least a portion of this paper travel information established in the $UP^3I$ standard, as well as additional paper travel information that is required but not presently established in the $UP^3I$ standard are transferred between the control units 12 through 20 in the manner of daisy chain, or alternatively via a real-time-capable bus system. At least the data transfer of this paper travel information thus occurs independent of the network connections 3.

In the exemplary embodiment according to FIG. 1, the layers for physical data transmission of UP$^3$I control data according to the IEEE 1394 standard are thus replaced with corresponding transmission layers of the Ethernet standard. The transfer of the UP$^3$I control data thus occurs with the aid of a different bit transmission layer. The physical layer (Layer 1) and the security layer (Layer 2) and the communication layer (Layer 3) according to the ISO/OSI 7-Layer Model of the respective Ethernet standard that is used can be adopted without modification, such that known, mature protocols can be resorted to provide these layers. The transport layer (Layer 4) via which an end-to-end connection (and not a point-to-point connection) is provided can also be replaced with a specific UP$^3$I application protocol, at least when TCP/IP is not used.

In particular, via the provision of such a data transfer with the aid of the network connections 3 it is also possible to provide an XML infrastructure so that structures defined at a semantic level can be exchanged. In particular, XML datagrams as well as XML messages of variable length can be provided. In spite of the comparably high protocol overhead for XML can advantageously be used in the control system 10 since—in particular due to the data transmission via the switched network connections 3—a sufficient bandwidth for data transmission is available and the processing of XML data can also be implemented simply via microcontrollers.

The frame format defined in the existing UP$^3$I standard can be largely retained in the control system 10. Although the flexibility of the data transfer is limited and the protocol traffic between the individual participants can be checked only to a limited extent due to this frame format established in the UP$^3$I standard, a high efficiency is enabled via the existing frame formats, via which in particular the real-time transfer of the data over the data connections 1 is enabled.

The data with processing information to control the entire processing process of the print path or of a complex printing system can thus advantageously be divided in particular into real-time-relevant data and management data without real-time relevance. These divided data can be processed via protocol stacks that are entirely independent of one another and are physically transferred between the control units 12 through 20 or 22 through 26 via separate or common cables. The transfer of management data depends on transferring relatively large amounts of information between the individual processing units or between their control stations 22, 24, 26 with the aid of an optimally flexible data structure. By real-time, what is presently to be understood in particular is the requirement to execute specific actions within a defined time period.

In the processing of web-shaped substrate material it is typical to generate what is known as a ⅙" signal as a paper feed signal via which the feed of the web-shaped substrate material by ⅙" is indicated. Given substrate material speeds of 1 m per second and more, typical personal computers can no longer process and transfer such information with the speed required for a real-time processing given use of a protocol typical in this context, for example Ethernet. If a real-time-capable bus system (such as a CAN bus) is used in parallel for data transfer between the control units 12 through 20 of the processing units, this ⅙" paper feed signal can be transferred and processed at a sufficient speed even given printing speeds or, respectively, paper feed speeds of more than 2 m per second.

In the present exemplary embodiment, the real-time information advantageously specifies the movement of the substrate material along the transport direction of the web-shaped substrate material (i.e. the production direction of the print path) from processing unit to processing unit, i.e. from the control unit 12 to the control unit 14, from the control unit 14 to the control unit 16, from the control unit 16 to the control unit 18 and from the control unit 18 to the control unit 20. The processing units themselves or, respectively, their control stations 22 through 26 are additionally connected or networked with one another via the switched Ethernet network connection 3 so that management function, for instance monitoring, exchange of user interfaces or remote control of all processing units of the print path can occur via these network connections 3. The various Ethernet nodes of the control stations 22 through 26 thus topologically form a network via which every control station 22 through 26 can logically reach every other control station 22 through 26. The actual wiring, in particular via the network switch 27, thereby plays no role.

The Ethernet network interfaces and the software components that are required for these are advantageously located not within the control units 12 through 20 of the apparatus controller of the respective processing unit but rather at the control station level. However, the respective control station 22 through 26 can also be combined into an apparatus—in particular into a microcontroller—together with the control unit of the apparatus controller of a processing unit or be integrated into this controller. This integration is subsequently explained in detail in connection with FIG. 4.

Additional operating functionalities are typically provided via a control panel 22, 24, 25 in addition to the UP$^3$I communication. For example, a control station 22, 24, 26 comprises a control panel with display and operating elements. The minimum requirement for the control stations 22 through 26 is the communication capability via the Ethernet network connection 3 and the communication with the respective control units 12 through 20 connected with the control stations 22, 24, 25, such that all processing information required for a processing unit but that do not require any real-time processing are transferred via the network connections 3 to the control station 22, 24, 26 of the processing unit, and furthermore to the apparatus control unit 12 through 20 of the respective processing unit.

The data connection to transfer data that require a real-time processing advantageously occurs between the apparatus controllers of the processing units, i.e. between the control units 12 through 20. A point-to-point connection respectively occurs between two control units 12 through 20. The two control units 12 through 20 connected via a point-to-point connection are advantageously arranged one immediately after another in the production direction. In addition to the paper travel information are also signals regarding a paper jam as well as a paper ID data that require a real-time processing.

The requirements for the individual control units 12 through 20 for the data connections 1 are relatively low. The CAN bus system requires a relatively simple, wide-spread protocol so that it can be implemented simply in existing microcontroller control units and in personal computers that serve as control units. The point-to-point connection between the control units can thereby be provided with the aid of a respective separate bus connection, respectively of a separate network connection, or with the aid of hard-wired hardware signals. This type of data transmission via multiple point-to-point connections is also designated as a daisy chain, wherein each control unit that is connected with two additional control units requires a separate hardware interface for every point-to-point connection. Alternatively, the real-time transmission of the data between the control units 12 through 26 can also occur via a common real-time-capable bus system, for example the CAN bus system or via continuous or looped-through control lines. The control units 12 through 20 are then thereby respectively connected with the common bus.

Alternatively or additionally, real-time-capable data connections can be provided to transfer the data that require a real-time processing between the control stations 22 through 26.

In the processing of single sheets, the real-time-capable data connection between the control units 12 through 20 can also be foregone if every processing unit contains a page or paper sensor so that it is known to the respective processing unit or so that every processing unit itself determines at which point in time a single sheet arrives. The additional required processing information or the necessary management data—that, for instance, contain concrete specifications as to which processing steps should be implemented with the respective single sheet—can be transferred in advance via the network connection 3 to the respective control station 22 through 26 and furthermore via the data connections 2a through 2c to the respective control unit 12 through 20.

Via the separation of the data transfer into a real-time-capable data transfer and a non-real-time-capable data transfer, prevalent, cost-effective transfer techniques for the transfer of large data sets and for the transfer of real-time-relevant data can also be resorted to for the automation of the print path. Although both the management data and the real-time-relevant data could be transferred via one data line given the use of alternative solutions, for example real-time Ethernet, the hardware cost and the development cost necessary to develop the required software would then be very high. Furthermore, relatively simple processing units would then also have to be equipped with relatively large data processing systems that must then additionally have a real-time operating system in order to ensure the real-time processing of the real-time-relevant data.

Apparatuses without compatible interface for real-time-capable transfer that are already present can be integrated into the real-time processing of the print path with the aid of what is known as a converter box. Such a converter can be realized very simply and cost-effectively between the CAN bus system and the prevalent Typ1 control interface, for example.

Figure 2:
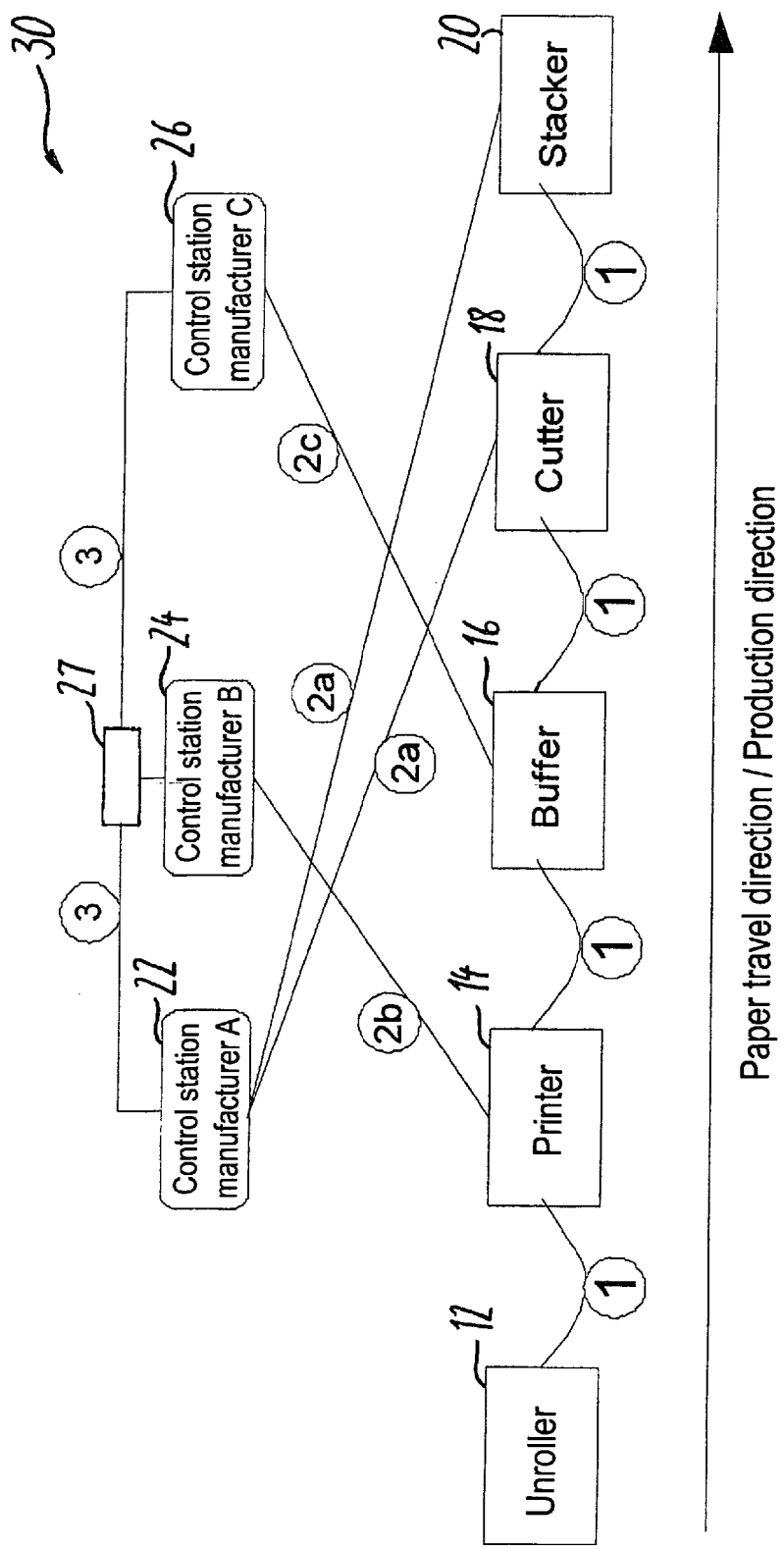
FIG. 2 is a schematic representation of a second control system to control processing units of a print path according to a second embodiment of the invention.

A control system 30 similar to the control system 10 according to FIG. 1 to control a print path, with the same processing units and the same control units 12 through 20 as in the print path according to FIG. 1, is shown in FIG. 2. Elements with the same design and/or the same function have the same reference characters.

In contrast to the control system 10 according to FIG. 1, in the control system 30 according to FIG. 2 no proprietary data connection 2a is provided between the control station 22 of the manufacturer A and the control unit 12 of the unrolling unit since, in the present exemplary embodiment according to FIG. 2, no additional processing information must be transferred with other processing units of the print path in addition to the data with processing information that are transferred via the data connection 1. If additional processing information (in particular management information), i.e. processing units that do not require a real-time processing, must also be transferred in addition to the paper travel information with which the control unit 14 of the printing unit transfers corresponding orders to the control unit 12 of the unrolling unit, these can also be transferred via the data connection 1. These data can in particular be transferred when, due to an inactive production process of the print path, real-time data do not need to be transferred via the data connections 1 between the control units 12 through 20.

Figure 3:
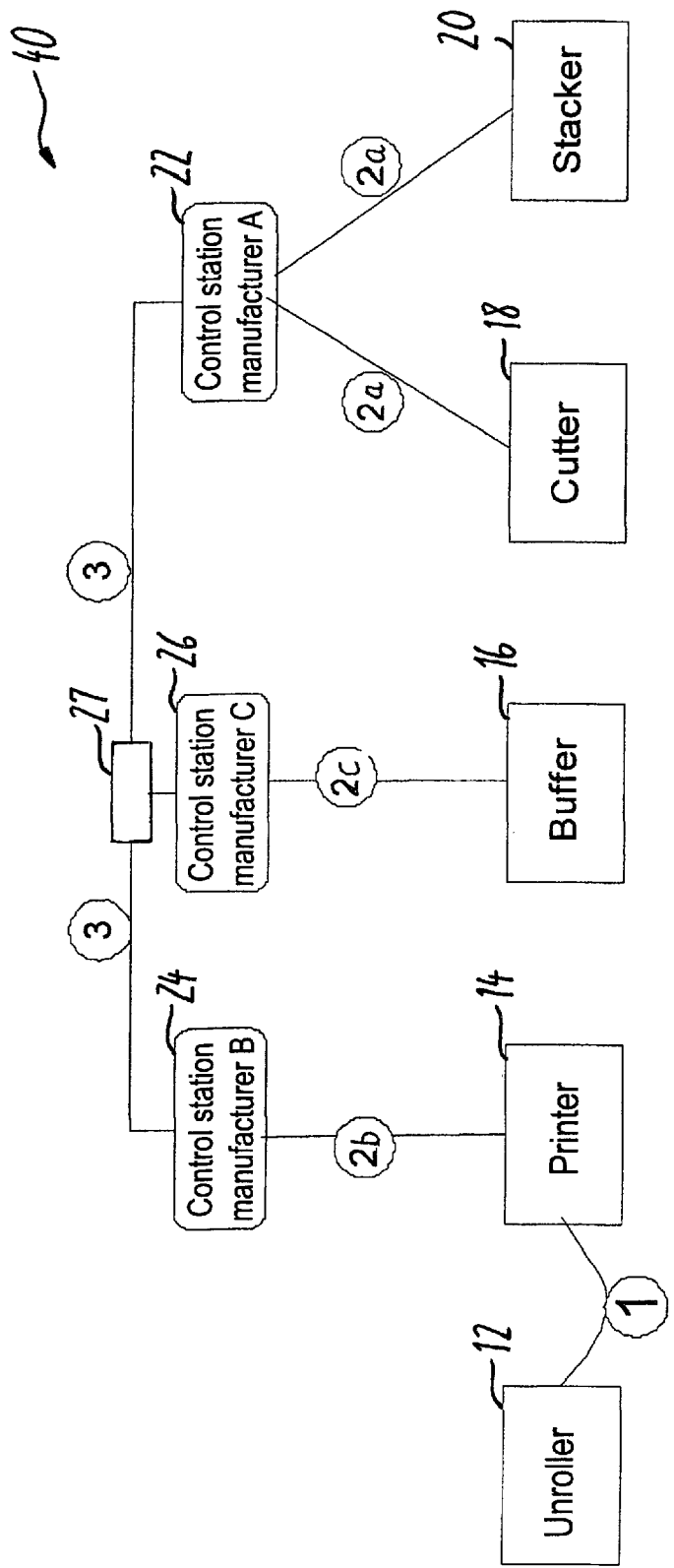
FIG. 3 is a schematic representation of a third control system to control processing units of a print path according to a third embodiment of the invention.

A control system 40 similar to the control systems 10 and 30 according to FIGS. 1 and 2 is shown in FIG. 3. However, the control system is provided only to control a print path for the processing of single sheets. No possibility to transfer real-time data between the control units 14, 16, 18, 20 is provided. The control stations 22 through 26 of the manufacturer A through C are connected among one another via a switched network in the same manner as explained in connection with FIGS. 1 and 2.

Figure 4:
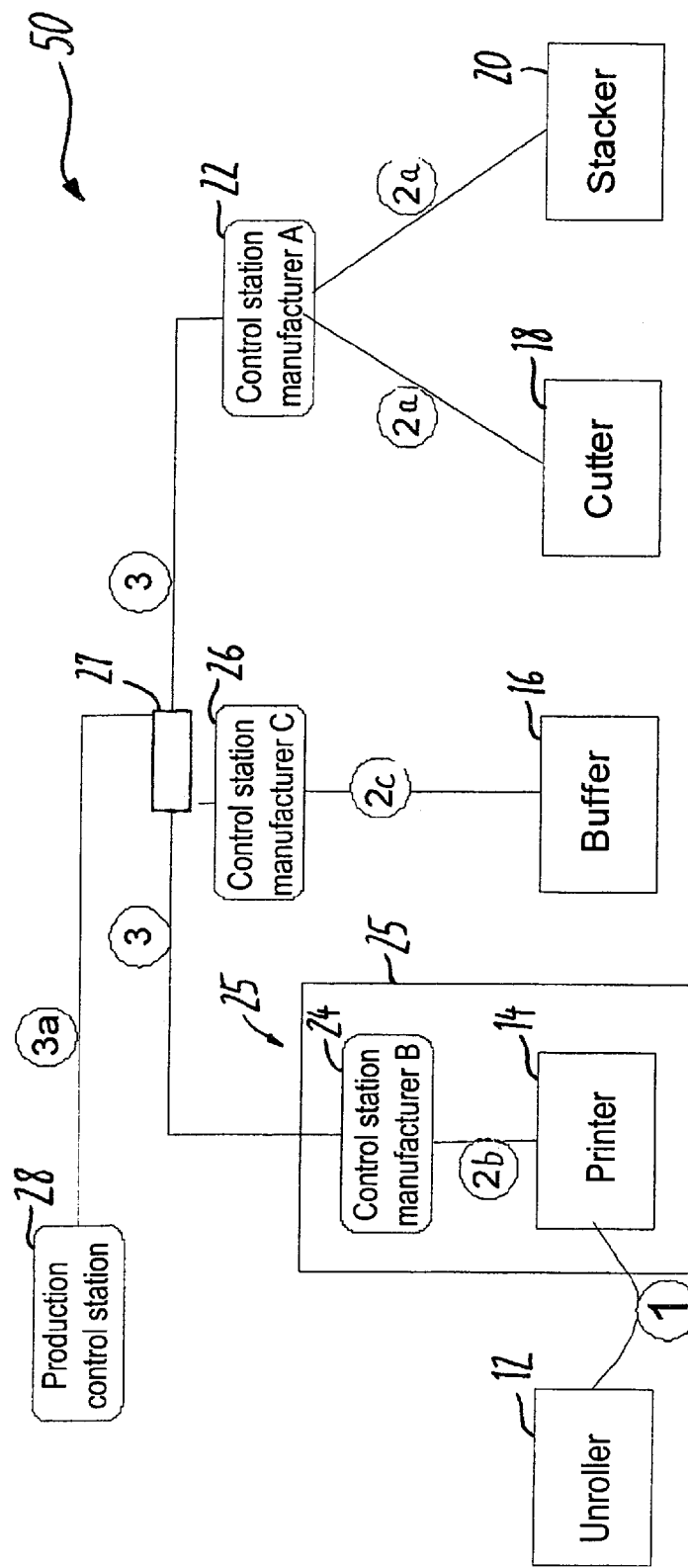
FIG. 4 is a schematic representation of a fourth control system to control processing units of a print path according to a fourth embodiment of the invention.

A control system 50 similar to the control system 40 according to FIG. 3 is shown in FIG. 4, wherein the control station 24 and the control unit 14 are integrated into the printing unit 25 and are advantageously provided by a single data processing system, for example a blade server. A production control station 28 is additionally provided that is connected as an additional control panel or additional control station with the network switch 27 via the network connection 3a.

An additional control station 28 can also be provided in the exemplary embodiments according to FIGS. 1 through 3. In all exemplary embodiments, a control station can also be provided in each processing unit, wherein such a control station does not necessarily comprise an operating unit.

Figure 5:
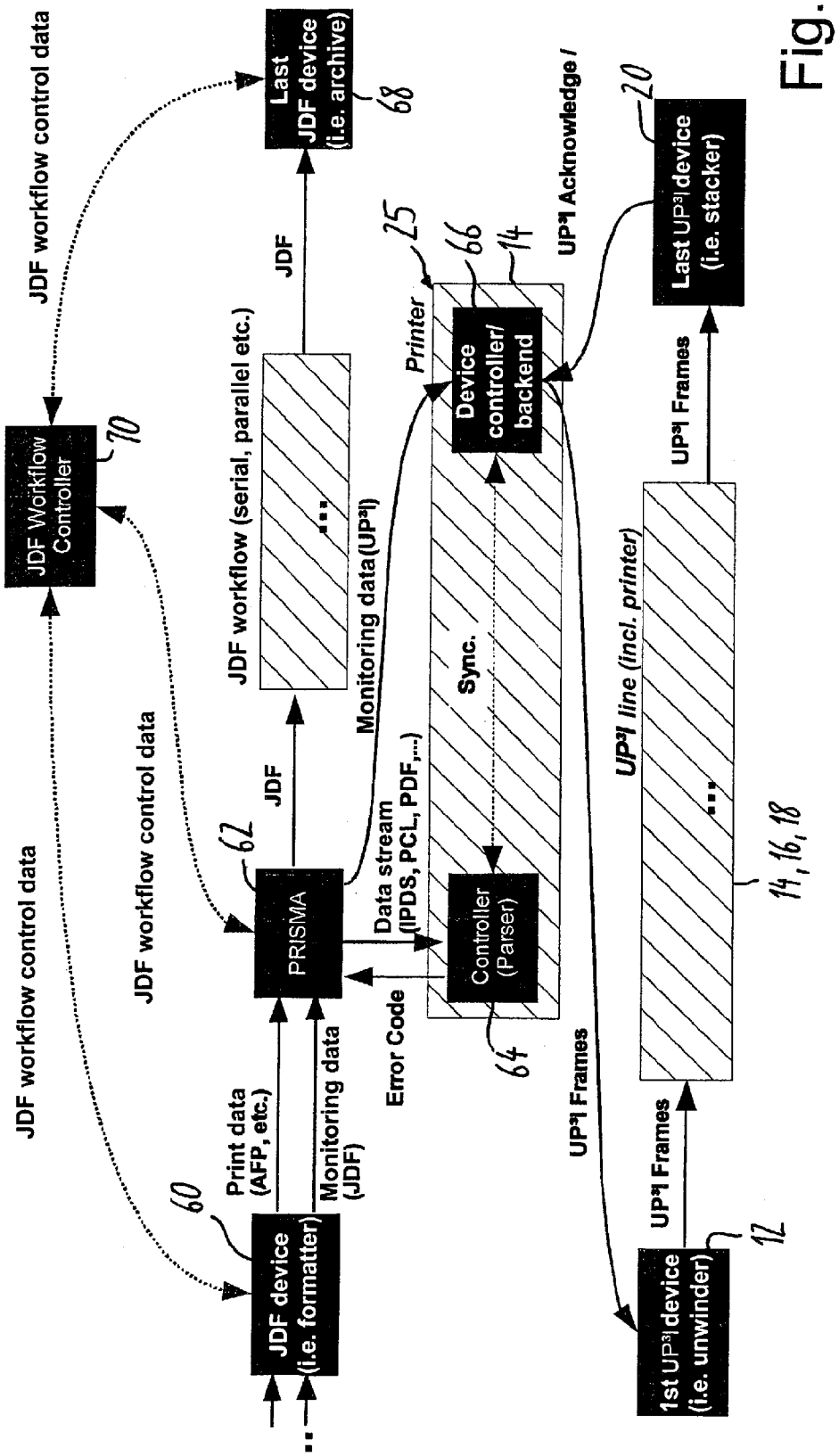
FIG. 5 is an overview of the data flow of print job an print control information in a printing system.

The operating sequence or workflow of a printing system with multiple processing units that is produced with the aid of job tickets according to the JDF is shown by way of example in FIG. 5. A JDF-capable apparatus 60 generates a print data stream with print data and monitoring data associated with these print data according to the JDF. These print and monitoring data are supplied to a print server 62. In the present case, the print server 62 is provided by a Prisma system from the company OCE. The print server 62 generates a print data stream and transfers this as a print job to be executed to the printer 25. The print data stream is supplied to the controller 64 of the printer 25. In contrast to the previous solutions to control the workflow, $UP^3I$ data are not integrated as well into the print data stream to be transferred to the controller 64 of the printer 25 but rather are transferred separately to the apparatus controller 66 of the printer 25. An integration is also possibly only with special print data streams of $UP^3I$ data in the print data stream in which an integration of additional data is provided. Such a data stream is, for example, the IPDS print data stream.

In the present exemplary embodiment, other print data streams such as PCL print data streams, PDF print data streams or additional arbitrary print data streams can be transferred from the print server 62 to the controller 64 via the separate transfer of the $UP^3I$ data. The $UP^3I$ data are thus directly transferred to the apparatus controller 66 of the printer 25, independent of the print data stream. The possibility also exists to base the $UP^3I$ control data more heavily on the JDF so that more flexible conversion of the JDF monitoring data into $UP^3I$ control data is possible. The Prisma print server system 62 thereby converts the JDF monitoring information that relates to large portions of or an entire print job into a page-accurate monitoring flow in the form of $UP^3I$ data.

A coordination or synchronization of the $UP^3I$ data transferred to the apparatus controller 66 and the print data transferred to the controller 64 can occur and be secured in the printer 25, for example with the aid of what are known as page IDs or form IDs.

Real-time information and real-time signals are thereby transferred from the apparatus controller 66 via one or more real-time-capable data connections corresponding to the paper travel between the processing units 12 through 20, as is described in detail in connection with FIGS. 1 and 2. In the completion of a processing of a single sheet or of a single print region (form) of a web-shaped substrate material that is identified with a paper ID, this is or these are checked off by the control unit 20 of the last processing unit of the print path in the apparatus controller 66 given corresponding, correct processing by the individual processing units. Alternatively, given an error, error information is transferred from one of the control units 12, 16 through 20 to the apparatus controller 66 of the printer 25 that advantageously generates corresponding error data and transfers them to the print server 62. It is thereby possible to implement a corresponding error handling in which in particular the print pages or print regions are determined that must be regenerated and processed in order to completely and correctly execute the print job.

Additional JDF control data to control a JDF workflow but that are not required for the printing process of the print path are initiated by the print server 62 as an additional parallel and serial JDF workflow, wherein the last JDF apparatus 68 (for example an archiving system to archive the print data) in the JDF workflow chain generates corresponding JDF workflow control data and transfers these to a JDF workflow controller 70 that controls the entire workflow, i.e. the entire operating sequence. Data connections for the exchange of JDF workflow control data also exist between the JDF workflow controller 70 and the print server 62 as well as between the JDF workflow controller 70 and the JDF apparatus 60.

Among other things, the controller 64 of the printer 25 serves to parse the PDL (Page Description Language) transferred by the print server 62 (for example PCL, AFP, IPDS, Postscript, PDF), to prepare it for one or more printing groups of the printer 25, to generate raster images based on the PDL print data (in particular with the aid of a raster image processor), and to transfer the prepared print data to the printing group or the printing groups of the printer 25. The apparatus controller 66 serves to control actuators and to evaluate sensor signals of sensors of the printer 25. The modules and elements in the printer 25 are thus controlled with the aid of the apparatus controller 66 so that the printing process can be executed correctly. For this the apparatus controller 66 can be connected with additional control units of the printer 25 via data lines, in particular a network or a bus system. These additional control units are in particular module control units.

The control stations cited in the exemplary embodiments are general communication components that provide a $UP^3I$ data interface for a processing unit or for multiple processing units and enable an exchange of data according to the $UP^3I$ standard for this processing unit or, respectively, these processing units.

The preferred embodiments can advantageously be used in electrographic printing or copying apparatuses whose recording method for image generation is in particular based on the electrophotographic, magnetographic or ionographic recording principle. The printing or copying apparatuses can also use a recording method for image generation in which an image recording substrate is directly or indirectly electrically activated point-by-point. However, the preferred embodiments are not limited to such electrographic printing or copying apparatuses.

Although preferred exemplary embodiments are shown and described in detail in the drawings and in the preceding specification, these should be viewed purely as examples and not as limiting the invention. It is noted that only preferred exemplary embodiments are presented and described, and all variations and modifications that presently and in the future lie within the protective scope of the invention should be protected.

We claim as our invention:

1. A method to transfer data between at least two processing units processing paper along a travel path common to both processing units of a printing or copying system, comprising the steps of: splitting up processing information to be transmitted between the at least two processing units for processing said paper along said travel path common to both of said processing units into first data and second data, the first data comprising at least paper travel information for said paper of said common travel path for which a real-time processing is required, and the second data comprising processing information for which a real-time processing is not required; connecting the at least two processing units via a non-switched network, real-time-capable data transmission path as a first physical layer wherein the first data are transferred with aid of said real-time-capable data transmission path between the at least two processing units; and also connecting the at least two processing units via a switched network connection separate from the real-time-capable transmission path that provides a second physical layer separate from the first physical layer to transfer data, and the switched network connection transferring said second data between the at least two processing units.

2. A method according to claim 1 wherein at least one network interface of each of the processing units is respectively connected with a network switch via which the second data to be transferred are buffered and relayed to at least the respective other processing unit, and wherein the network interface is formed by a communication unit connected with a control unit of the respective processing unit.

3. A method according to claim 1 wherein the processing information are not transferred in real time via the switched network connection and wherein at least a content of the processing information is established in a $UP^3I$ standard.

4. A method according to claim 1 wherein control information to control the processing units of the printing or copying system to execute a print job are transferred in addition to the processing information, or at least a portion of the control information is generated by the respective processing unit via a processing of the processing information.

5. A method according to claim 1 wherein the first data are transferred with the aid of a real-time-capable bus system.

6. A method according to claim 1 wherein the paper travel information serves to control production workflow to process a substrate material with aid of the printing or copying system.

7. A method according to claim 1 wherein a data transmission route for the transfer of the first data between at least three of the processing units occurs serially as a daisy chain between the first processing unit and the second processing unit and between the second processing unit and the third processing unit.

8. A method according to claim 1 wherein the processing units respectively have a control station, wherein the control stations are connected with one another via the switched network connection to transfer the second data; in that each control station is connected with at least one control unit of the respective processing unit; and wherein at least one control unit of each of the two processing units or the control stations is connected with at least one control unit of the other processing unit or with the other control station via a real-time-capable data connection to transfer the first data.

9. A method according to claim 1 wherein the switched network connection is provided by at least one of the elements selected from the group consisting of a switched Ethernet network connection and a wireless network connection via an access point.

10. A method according to claim 1 wherein the processing information comprises management data to administer the processing units among one another, control data with measurement values and setting values to provide at least one of the elements selected from the group consisting of a user interface program data to provide control programs, and user interfaces that are associated with the second data; and wherein at least a portion of the second data are additionally or alternatively transferred with aid of the real-time-capable data connection while the processing units of the printing or copying system are not actively processing substrate material.

11. A method according to claim 1 wherein the printing or copying system comprises a digital printing path, wherein the processing unit for processing a substrate material has at least one printing unit with at least one printing group and at least one additional processing unit.

12. A system to transfer data between at least two processing units both processing paper along a travel path common to both processing units of a printing or copying system, comprising: the processing units both processing said paper along said travel path common to both of said processing units being connected via a non-switched network, real-time-capable data transmission path; the real-time-capable data transmission path as a first physical layer serving to transfer first data comprising paper travel information for said travel path for which a real-time processing is required; and the processing units also being connected via a switched network connection separate from the real-time-capable data transmission path that provides a second physical layer separate from the first physical layer to transfer data, the switched network connection serving to transfer second data with processing information for which a real-time processing is not required.

* * * * *